(12) United States Patent
Kokuzawa et al.

(10) Patent No.: US 7,196,845 B2
(45) Date of Patent: Mar. 27, 2007

(54) FRESNEL LENS SHEET AND REAR PROJECTION SCREEN

(75) Inventors: Yukio Kokuzawa, Kanagawa (JP); Katsuyuki Murai, Kanagawa (JP); Mitsuhiro Akiyama, Tochigi (JP)

(73) Assignees: Mitsubishi Gas Chemical Company, Inc., Tokyo (JP); Japan Acryace Corporation, Tokyo (JP)

( * ) Notice: Subject to any disclaimer, the term of this patent is extended or adjusted under 35 U.S.C. 154(b) by 96 days.

(21) Appl. No.: 10/779,626

(22) Filed: Feb. 18, 2004

(65) Prior Publication Data

US 2004/0227991 A1    Nov. 18, 2004

(30) Foreign Application Priority Data

Feb. 18, 2003    (JP)    ............................. 2003-039432

(51) Int. Cl.
  *G03B 21/56*    (2006.01)
  *G03B 21/60*    (2006.01)
  *G02B 3/08*    (2006.01)
(52) U.S. Cl. ...................... 359/453; 359/460; 359/742
(58) Field of Classification Search ........ 359/452–453, 359/455–457, 742–743, 460; 264/1.6, 2.5
See application file for complete search history.

(56) References Cited

U.S. PATENT DOCUMENTS

| | | | | |
|---|---|---|---|---|
| 5,513,036 A | * | 4/1996 | Watanabe et al. | 359/457 |
| 5,751,478 A | * | 5/1998 | Yoshimura et al. | 359/453 |
| 6,307,675 B1 | * | 10/2001 | Abe et al. | 359/457 |
| 6,663,953 B2 | * | 12/2003 | Kamiya et al. | 359/742 |
| 6,707,605 B2 | * | 3/2004 | Sekiguchi | 359/457 |
| 6,943,948 B2 | * | 9/2005 | Honda et al. | 359/457 |
| 2006/0001963 A1 | * | 1/2006 | Ishikawa | 359/457 |

* cited by examiner

*Primary Examiner*—Christopher Mahoney
(74) *Attorney, Agent, or Firm*—Antonelli, Terry, Stout and Kraus, LLP.

(57) ABSTRACT

A Fresnel lens sheet comprising a Fresnel lens substrate and a Fresnel lens, whose surface of the light source side has an average pitch of 200 μm or smaller and ten point roughness of 3 to 15 μm, a rear projection screen obtained by assembling the Fresnel lens sheet and a lenticular lens sheet, and a process for producing these. With the use of the Fresnel lens sheet and the rear projection screen in accordance with the present invention, a labyrinth light inside the screen and a surface reflection are diffused effectively and a ghost caused by them is remarkably reduced. Accordingly, the rear projection television employing the Fresnel lens sheet and the rear projection screen of the present invention provides excellent images without ghost light.

18 Claims, 2 Drawing Sheets

FRESNEL LENS SHEET AND REAR PROJECTION SCREEN

BACKGROUND OF THE INVENTION

1. Field of the Invention

The present invention relates to a Fresnel lens sheet and a rear projection screen employed for a rear projection television.

2. Description of the Prior Art

In a rear projection television being one of a large-screen televisions, an image light projected from a light source reflects on a reflection mirror forms an image over a screen. The screen consists basically of a Fresnel lens sheet, a lenticular lens sheet and a front panel respectively from the light source side resulting in three pieces constitution.

A rear projection screen employed for a rear projection television is usually obtained by assembling a Fresnel lens sheet and a lenticular lens sheet. However, a light reflection on the surface of the Fresnel lens sheet and a labyrinth light inside the Fresnel lens sheet cause some distortions on the projected image. For example, in the case where a screen of the rear projection television is watched up from down side in a short distance, the projected image on the upper area of the screen is observed a little down side of it being magnified. The phenomenon that these multiple images are observed is generally called as ghost. The reason why the ghost appears is considered that the labyrinth light within the Fresnel lens sheet and the reflected light from the surface of the light source side of the Fresnel lens sheet reflect back on a reflection mirror, and then enter into the Fresnel lens sheet again. Further, the ghost has a tendency of being emphasized because, in late years, the luminance of the light source is elevated for improving an image luminance.

This phenomenon will be explained with the use of a drawing (FIG. 1). In a rear projection screen obtained by deploying reflection mirror 2 on a rear of Fresnel lens sheet 1, incident light 3 from a light source enters into Fresnel lens sheet 1 and emit to an observer's side. On the surface 5 of the light source side of the Fresnel lens sheet 1, the light partly reflects and reflects again on reflection mirror 2 thereby emitting as ghost light 4b to the observer's side. Further, incident light 3 into Fresnel lens 1 partly reflects on the surface 6 of the outgoing radiation side of the Fresnel lens 1 and reflects again on the surface 5 of the light source side of the Fresnel lens sheet 1 and on reflection mirror 2 thereby emitting as ghost lights 4a and 4c.

In order to reduce such a ghost, Japanese Patent Application Laid-Open No. Hei 5-158153 proposes a formation of hairlines in the direction perpendicular to longitudinal direction of a lenticular lens over the surface of the other side of a Fresnel lens forming surface. Further, Japanese Patent Application Laid-Open No. Hei 5-127257 proposes a formation of a uniform rugged structure over the surface of the other side of a Fresnel lens forming surface and also proposes specifying the haze value, half brightness angle, ⅓ brightness angle, etc., within a certain range. Furthermore, Japanese Registered Patent No. 3056571 discloses a formation of an antireflection film over the surface of the other side of a Fresnel lens forming surface.

As described in the foregoing prior art, diffusing or decreasing the labyrinth lights within the screen and surface reflection by means of forming a rugged structure or antireflection process over the surface of light source side of the Fresnel lens sheet reduces the ghost. However, the effects of the foregoing prior art are insufficient for the rear projection televisions employing the recent light sources with the highly elevated luminance.

SUMMARY OF THE INVENTION

The object of the present invention is to provide a method of ghost reduction that is more effective, simple and convenient than the foregoing prior art.

As a result of intensive studies about the ghost reduction by the inventors, the following technique was found to be effective for reducing the ghost. Namely, the present invention provides a Fresnel lens sheet comprising a Fresnel lens substrate and a Fresnel lens, whose surface of the light source side has an average pitch of 200 μm or smaller and ten point roughness of 3 to 15 μm. The present invention further provides a rear projection screen obtained by assembling the Fresnel lens sheet with a lenticular lens sheet.

DESCRIPTION OF THE PREFERRED EMBODIMENTS

According to the present invention, a Fresnel lens sheet comprises a Fresnel lens substrate and a Fresnel lens, whose surface of the light source side has an average pitch of 200 μm or smaller and ten point roughness of 3 to 15 μm.

Figure 1:
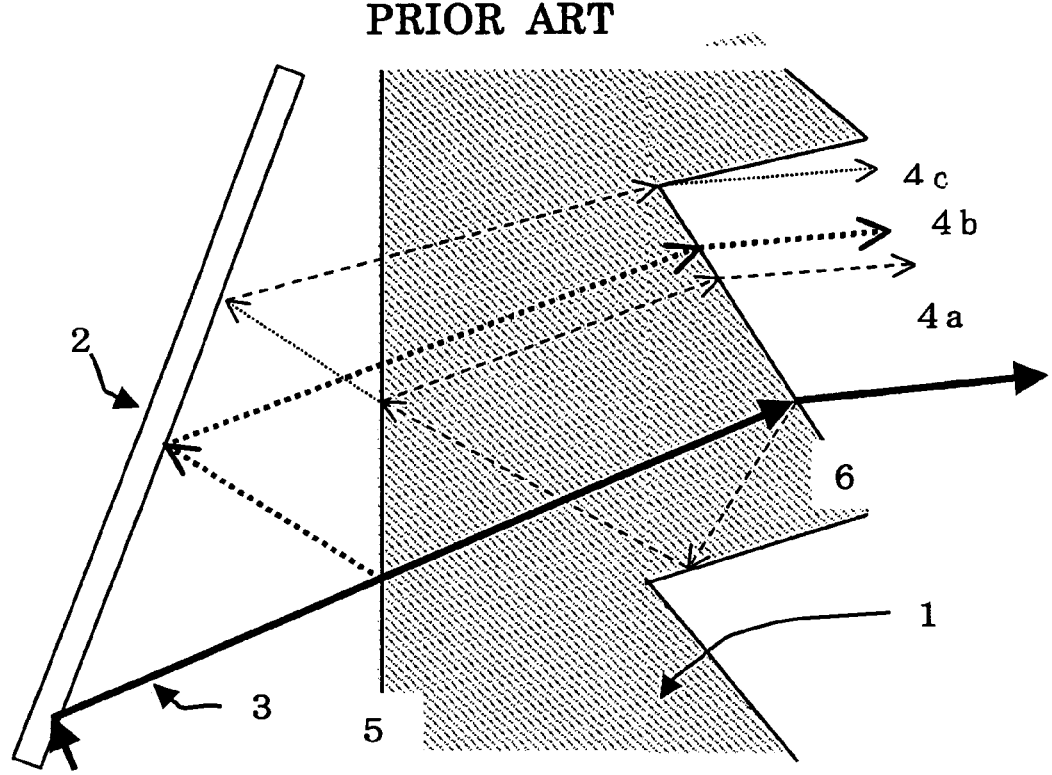
FIG. 1 illustrates the mechanism that ghost appears.
Figure 2:
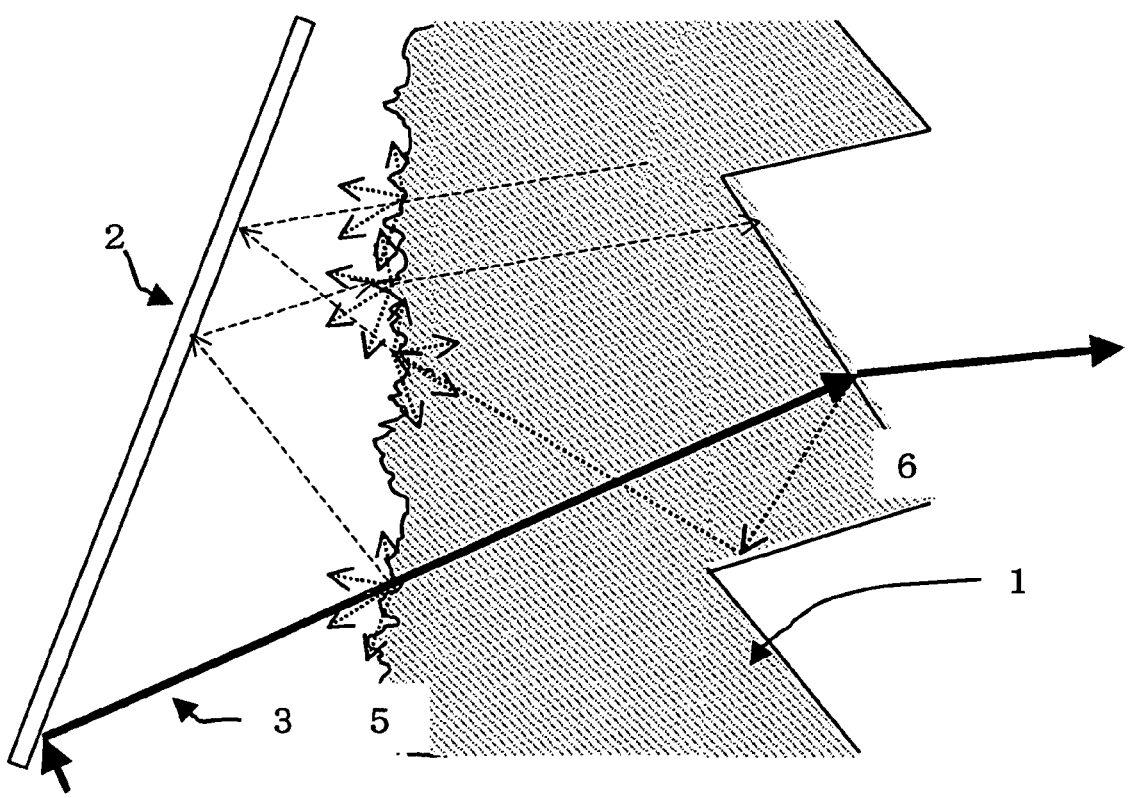
FIG. 2 illustrates the mechanism of ghost reduction according to the present invention.

Referring now to FIG. 2 illustrating mechanism of ghost reduction according to the present invention, in a rear projection screen obtained by deploying reflection mirror 2 on a rear of Fresnel lens sheet 1, incident light 3 from a light source enters into Fresnel lens sheet 1 and emit to an observer's side. Then, a part of incident light 3 reflects on the surface 5 of the light source side of Fresnel lens sheet 1, however, the reflected light expressed by dotted line do not advance in one direction but scatter to various direction because the surface 5 of the light source side has a rugged structure. As a result, the ghost light becomes too weak to be observed easily.

The pitch of the surface 5 of the light source side of the Fresnel lens sheet 1 is necessary to be appropriately small because too large value of the pitch brings the figure of rugged structure coming out in the screen. With regard to the height of rugged structure of the surface of the light source side, it is necessary to be suitably tall in order to effectively diffuse a labyrinth light within the Fresnel lens sheet and a reflected light from the surface. As a result of zealous studies by the inventors, the conclusion that the average pitch is preferable to be 200 μm or smaller and that the ten point roughness expressing the height of rugged structure is preferable to be 3 to 15 μm was obtained. Further, the average pitch is more preferable to be 150 μm or smaller and the ten point roughness is more preferable to be 4 to 12 μm. When the average pitch exceeds 200 μm or when the ten point roughness is lower than 3 μm, the labyrinth light and the reflected light from the surface fail to be effectively diffused.

Figure 3:
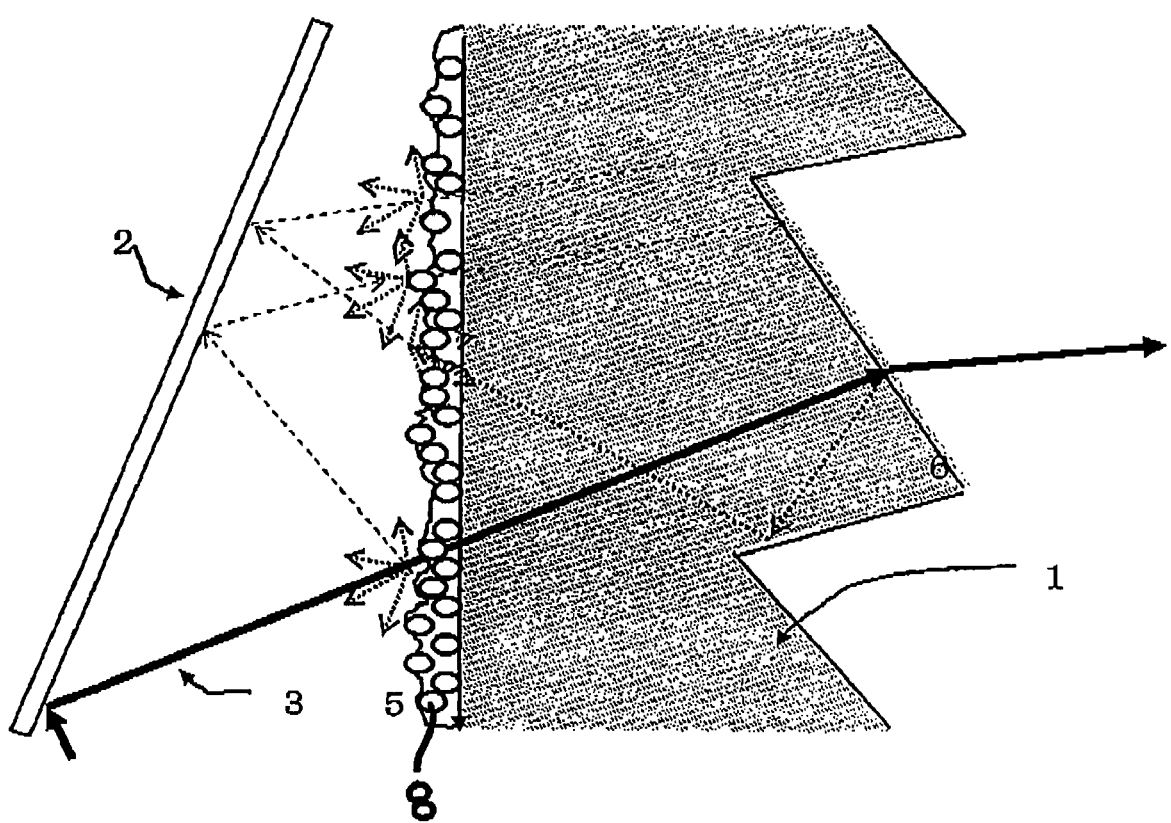
FIG. 3 illustrates an embodiment of the present invention wherein the Fresnel lens sheet includes light diffusible fine particles.

As a method for forming a rugged structure over the surface of the light source side of the Fresnel lens sheet according to the present invention, an addition of light diffusible fine particles to the material of the Fresnel lens sheet is considered to be practical. Namely, by the use of a Fresnel lens substrate comprising a thermoplastic resin in an amount of 100 parts by weight and light diffusible fine particles 8 (see FIG. 3) with the average particle diameter of 13 to 30 μm and with an index of refraction satisfying the following equation (1):

$$0 \leq |Np-Ns| < 0.02 \tag{1}$$

wherein Np represents an index of refraction of the thermoplastic resin, and Ns represents an index of refraction of light diffusible fine particles; in an amount of 6 to 30 parts by weight, the surface of the light source side of the Fresnel lens sheet has a fine rugged structure, as seen in FIG. 3.

The additional amount of the light diffusible fine particles is more preferable to be 9 to 20 parts by weight into 100 parts by weight of thermoplastic resin. When the additional amounts of the light diffusible fine particles is too few, enough roughness does not appear; and when they are too many, appearance defects such as streaks or shrink marks generate owing to the light diffusible fine particles.

In the case where the rugged structure is formed over the surface of the light source side of the Fresnel lens sheet by adding the light diffusible fine particles, the more the additional amounts, the greater the ten point roughness height and the shorter the pitch, thereby promoting the ghost reduction effective. However, when index of refraction of the light diffusible fine particle is too different from that of the thermoplastic resin as the substrate, the more the additional amount, the greater the haze value of the Fresnel lens sheet. The attempt to obtain a surface state having a practical ghost reduction effect in this case will elevate the haze value too great to provide enough luminance. In other words, in accordance with employing the light diffusible fine particle having index of refraction satisfying the foregoing equation (1) provides a Fresnel lens sheet with a practical haze value even in the case where the additional amounts of the light diffusible fine particles is many. When an average particle diameter of the light diffusible fine particles is too small, a sufficient ten point roughness cannot be provided. On the other hand, when the average particle diameter of the light diffusible fine particle is too large, the productivity of the Fresnel lens substrate decreases furiously. Therefore, it is preferable that the average particle diameter of the light diffusible fine particles is 13 to 30 μm. For example, in the case where a methyl methacrylate-styrene copolymer resin with weight average molecular weight of 150000 and with index of refraction of 1.53 obtained by copolymerization of monomer mixture consisting of methyl methacrylate in an amount of 64% by weight and styrene in an amount of 36% by weight is employed as the thermoplastic resin, it is preferable to use methyl methacrylate-styrene cross-linked fine particles (index of refraction: 1.53), etc.; and in the case where a polymethyl methacrylate (PMMA) with index of refraction of 1.49 is employed as the thermoplastic resin, it is preferable to use acryl cross-linked fine particles (index of refraction: 1.49), etc.

Further, the Fresnel lens substrate may be composed of multilayered constitution having two or more layers consisting of thermoplastic resin, and by adding the light diffusible fine particles among only the light source side surface layer, an effective rugged structure will be formed with a fewer additional amount. On that occasion, although the large effect of the rugged structure will be obtained with the fewer additional amount under the premise that the thickness of the light source side surface layer is thinner and thinner, the thickness is not particularly specified.

As another method for forming a rugged structure over the surface of the light source side of the Fresnel lens sheet according to the present invention, a molding method with the use of a metallic mold having a rugged structure is also considered to be practical. Namely, an extrusion molding of a thermoplastic resin with the use of a metallic roller having a surface of the rugged structure forms the rugged structure over the surface of the molded thermoplastic article, which is employed as the Fresnel lens substrate. This method is effective, but not limited, to the extrusion molding. When the rugged structure on the surface of the metallic roller is too low, the rugged structure over the surface of the Fresnel lens substrate do not satisfy the effective condition, in other words, the average pitch of 200 μm or smaller and the ten point roughness of at least 3 μm. Further, when the rugged structure on the surface of the metallic roller is too high, the thermoplastic resin in melting state adheres to the metallic roller causing tremendous damages in productivity. As a result of intensive studies by the inventors, a conclusion that the ten points averaged surface roughness and the average pitch of the metallic roller is preferable to be 6 to 15 μm and 100 to 300 μm respectively has been achieved. By the use of such a roller, a Fresnel lens sheet with a ten point roughness of 3 to 15 μm and with average pitch of 200 μm or smaller becomes obtainable.

Typical examples of the thermoplastic resin employed for the Fresnel lens substrate composing the Fresnel lens sheet of the present invention include, but not particularly limited to, an optional copolymer resin selected among methyl methacrylate, methacrylate, styrene and so on or polycarbonate, etc. Among these, a copolymer resin of methyl methacrylate and styrene is the most preferable in the viewpoints of transparency, rigidity, water absorption, index of refraction, etc.

The present invention shall be explained below in further details with reference to examples, but the present invention shall by no means be restricted by the following examples.

EXAMPLES

In the Example, a methyl methacrylate-styrene copolymer resin (pellet with weight average molecular weight of 150000 and index of refraction: 1.53) obtained by copolymerizing monomer mixture of methyl methacrylate in an amount of 64% by weight and styrene in an amount of 36% by weight was employed as the thermoplastic resin.

As the measuring equipment, SURFCOM 554A produced by TOKYO precision Co., Ltd. was used for measuring ten point roughness (Rz) and average pitch (Sm), and Haze Meter COH-300A produced by NIPPON DENSHOKU Co., Ltd. was used for measuring haze.

For the ghost evaluation, LCD rear projection television available in the markets was used dismantling regular Fresnel lens sheet and mounting Fresnel lens sheet sample of each Example. The ghost was evaluated with visual observation from a predetermined distance by projecting a test pattern image.

The evaluation of the ghost was ranked by the following standards.

AA: Extremely excellent (The ghost reduction effect is great)
A: Excellent (The ghost reduction effect is practical)
B: Not so good (The ghost reduction effect is small)
C: Poor (No ghost reduction effect is observed)

Example 1

A multilayer sheet was obtained by co-extrusion molding the first layer comprising 100 parts of methyl methacrylate-styrene copolymer resin and 13 parts of styrene-methyl methacrylate cross-linked light diffusible fine particles (average particle diameter: 18 μm, index of refraction: 1.53) with no difference in index of refraction between methyl methacrylate-styrene copolymer resin and the second layer comprising methyl methacrylate-styrene copolymer resin. In this occasion, each thickness of the first layer and the second layer was about 0.2 mm and about 1.8 mm respectively. Haze, ten point roughness (Rz) and average pitch (Sm) of the first layer in this multilayer sheet were measured. After laminating a Fresnel lens sheet over the second layer of this multilayer sheet and further assembling with a lenticular lens sheet, they were mounted to the foregoing rear projection television and then, presence or absence of ghost phenomenon was evaluated by means of visual observation. The results are shown in Table 1.

Example 2

A multilayer sheet was obtained by co-extrusion molding the first layer comprising 100 parts of methyl methacrylate-styrene copolymer resin and 6.6 parts of styrene-methyl methacrylate cross-linked light diffusible fine particles (average particle diameter: 18 μm, index of refraction: 1.53) with no difference in index of refraction between methyl methacrylate-styrene copolymer resin and the second layer comprising methyl methacrylate-styrene copolymer resin. In this occasion, each thickness of the first layer and the second layer was about 0.2 mm and about 1.8 mm respectively. Haze, ten point roughness (Rz) and average pitch (Sm) of the first layer in this multilayer sheet were measured. After laminating a Fresnel lens sheet over the second layer of this multilayer sheet and further assembling with a lenticular lens sheet, they were mounted to the foregoing rear projection television and then, presence or absence of ghost phenomenon was evaluated by means of visual observation. The results are shown in Table 1.

Example 3

In the preparation of a methyl methacrylate-styrene copolymer resin by extrusion molding, one of polishing rollers was replaced to an embossed metallic roller having a surface of a rugged structure with ten point roughness (Rz) of 7 μm, and average pitch (Sm) of 130 μm, thereby obtained a piece of sheet (Fresnel lens substrate) with a surface of a rugged structure on one side. Haze, ten point roughness (Rz) and average pitch (Sm) of this sheet (Fresnel lens substrate) were measured. After laminating a Fresnel lens sheet over this sheet (Fresnel lens substrate) and further assembling with a lenticular lens sheet, they were mounted to the foregoing rear projection television and then, presence or absence of ghost phenomenon was evaluated by means of visual observation. The results are shown in Table 1.

Comparative Example 1

A monolayer sheet comprising 100 parts of methyl methacrylate-styrene copolymer resin and 0.8 parts of styrene-methyl methacrylate cross-linked light diffusible fine particles (average particle diameter: 12 μm, index of refraction: 1.55) with a difference of 0.02 in index of refraction between methyl methacrylate-styrene copolymer resin was obtained. Haze, ten point roughness (Rz) and average pitch (Sm) of this monolayer sheet were measured. After laminating a Fresnel lens sheet over the second layer of this multilayer sheet and further assembling with a lenticular lens sheet, they were mounted to the foregoing rear projection television and then, presence or absence of ghost phenomenon was evaluated by means of visual observation. The results are shown in Table 1.

Comparative Example 2

A multilayer sheet was obtained by co-extrusion molding the first layer comprising 100 parts of methyl methacrylate-styrene copolymer resin and 4.5 parts of styrene-methyl methacrylate cross-linked light diffusible fine particles (average particle diameter: 12 μm, index of refraction: 1.55) with difference of 0.02 in index of refraction between methyl methacrylate-styrene copolymer resin and the second layer comprising methyl methacrylate-styrene copolymer resin. Thickness of each layer was almost the same as in Example 1. Haze, ten point roughness (Rz) and average pitch (Sm) of the first layer in this multilayer sheet were measured. After laminating a Fresnel lens sheet over the second layer of this multilayer sheet and further assembling with a lenticular lens sheet, they were mounted to the foregoing rear projection television and then, presence or absence of ghost phenomenon was evaluated by means of visual observation. The results are shown in Table 1.

Comparative Example 3

A monolayer sheet of only a methyl methacrylate-styrene copolymer resin was obtained by extrusion molding. Haze, ten point roughness (Rz) and average pitch (Sm) of this monolayer sheet were measured. After laminating a Fresnel lens sheet over the second layer of this multilayer sheet and further assembling with a lenticular lens sheet, they were mounted to the foregoing rear projection television and then, presence or absence of ghost phenomenon was evaluated by means of visual observation. The results are shown in Table 1.

TABLE 1

| | | Ex. 1 | Ex. 2 | Ex. 3 | Com. Ex. 1 | Com. Ex. 2 | Com. Ex. 3 |
|---|---|---|---|---|---|---|---|
| First Layer | Particle Diameter of light diffusing fine particle (μm) | 18 | 18 | — | 12 | 12 | — |
| | Addition Amount (part) | 13 | 6.6 | — | (0.8) | 4.5 | — |
| Second Layer | Particle Diameter of light diffusing fine particle (μm) | — | — | — | 12 | — | — |
| | Additional Amount (part) | — | — | — | 0.8 | — | — |
| Haze | (%) | 35 | 13 | 27 | 55 | 35 | 0.1 |
| Rz | (μm) | 6.6 | 3.3 | 3.7 | 1.6 | 2.2 | |
| Sm | (μm) | 151 | 176 | 86 | 300 | 174 | |
| Ghost Evaluation | | AA | A | A | C | B | C |

With the use of the Fresnel lens sheet and the rear projection screen in accordance with the present invention, a labyrinth light inside the screen and a surface reflection are diffused effectively and a ghost caused by them is remarkably reduced. Accordingly, the rear projection television employing the Fresnel lens sheet and the rear projection screen of the present invention provides excellent images without ghost light.

While there has been shown and described what are at present considered the preferred embodiments of the invention, it will be obvious to those skilled in the art that various changes and modification may be made therein without departing from the scope of the invention defined by the appended claims.

The invention claimed is:

1. A Fresnel lens sheet comprising a Fresnel lens substrate and a Fresnel lens, whose surface of the light source side has a rugged structure with an average pitch of 200 μm or smaller and ten point roughness of 3 to 15 μm, wherein said Fresnel lens substrate comprises a thermoplastic resin in an amount of 100 parts by weight and light diffusible fine particles with the average particle diameter of 13 to 30 μm and with an index of refraction satisfying the following equation (1):

$$0 \leq |Np-Ns| < 0.02 \quad (1)$$

wherein Np represents an index of refraction of the thermoplastic resin, and Ns represents an index of refraction of light diffusible fine particles, in an amount of 6 to 30 parts by weight.

2. The Fresnel lens sheet according to claim 1, wherein said Fresnel lens substrate comprises a thermoplastic resin obtained by molding with the use of a metallic roller having a surface with ten point roughness of 6 to 15 μm.

3. The Fresnel lens sheet according to claim 2, wherein said Fresnel lens substrate comprises a copolymer resin of methyl methacrylate and styrene.

4. The Fresnel lens sheet according to claim 1, wherein said Fresnel lens substrate comprises a copolymer resin of methyl methacrylate and styrene.

5. The Fresnel lens sheet according to claim 1, which includes 9 to 20 parts by weight of said light diffusible fine particles.

6. A Fresnel lens sheet comprising a Fresnel lens substrate and a Fresnel lens, whose surface of the light source side has a rugged structure with an average pitch of 200 μm or smaller and ten point roughness of 3 to 15 μm, wherein said Fresnel lens substrate comprises a thermoplastic resin obtained by molding with the use of a metallic roller having a surface with ten point roughness of 6 to 15 μm.

7. The Fresnel lens sheet according to claim 6, wherein said Fresnel lens substrate comprises a copolymer resin of methyl methacrylate and styrene.

8. A rear projection screen obtained by assembling a Fresnel lens sheet comprising a Fresnel lens substrate and a Fresnel lens, whose surface of the light source side has a rugged structure with an average pitch of 200 μm or smaller and ten point roughness of 3 to 15 μm, and a lenticular lens sheet, wherein said Fresnel lens substrate comprises a thermoplastic resin in an amount of 100 parts by weight and light diffusible fine particles with the average particle diameter of 13 to 30 μm and with an index of refraction satisfying the following equation (1):

$$0 \leq |Np-Ns| < 0.02 \quad (1)$$

wherein Np represents an index of refraction of the thermoplastic resin, and Ns represents an index of refraction of light diffusible fine particles, in an amount of 6 to 30 parts by weight.

9. The rear projection screen according to claim 8, wherein said Fresnel lens substrate comprises a thermoplastic resin obtained by molding with the use of a metallic roller having a surface with ten point roughness of 6 to 15 μm.

10. The rear projection screen according to claim 9, wherein said Fresnel lens substrate comprises a copolymer resin of methyl methacrylate and styrene.

11. The rear projection screen according to claim 8, wherein said Fresnel lens substrate comprises a copolymer resin of methyl methacrylate and styrene.

12. The Fresnel lens sheet according to claim 8, which includes 9 to 20 parts by weight of said light diffusible fine particles.

13. A rear projection screen obtained by assembling a Fresnel lens sheet comprising a Fresnel lens substrate and a Fresnel lens, whose surface of the light source side has a rugged structure with an average pitch of 200 μm or smaller and ten point roughness of 3 to 15 μm, and a lenticular lens sheet, wherein said Fresnel lens substrate comprises a thermoplastic resin obtained by molding with the use of a metallic roller having a surface with ten point roughness of 6 to 15 μm.

14. The rear projection screen according to claim 13, wherein said Fresnel lens substrate comprises a copolymer resin of methyl methacrylate and styrene.

15. A process for producing a Fresnel lens sheet comprising a step of molding a Fresnel lens substrate comprising a thermoplastic resin in an amount of 100 parts by weight and light diffusible fine particles with the average particle diameter of 13 to 30 μm and with an index of refraction satisfying the following equation (1):

$$0 \leq |Np-Ns| < 0.02 \quad (1)$$

wherein Np represents an index of refraction of the thermoplastic resin, and Ns represents an index of refraction of light diffusible fine particles, in an amount of 6 to 30 parts by weight; with the use of a metallic roller having a surface with ten point roughness of 6 to 15 μm.

16. The process according to claim 15, wherein the Fresnel lens sheet includes 9 to 20 parts by weight of said light diffusible fine particles.

17. A process for producing a rear projection screen comprising a step of forming a Fresnel lens sheet by molding a Fresnel lens substrate comprising a thermoplastic resin in an amount of 100 parts by weight and light diffusible fine particles with the average particle diameter of 13 to 30 μm and with an index of refraction satisfying the following equation (1):

$$0 \leq |Np-Ns| < 0.02 \quad (1)$$

wherein Np represents an index of refraction of the thermoplastic resin, and Ns represents an index of refraction of light diffusible fine particles, in an amount of 6 to 30 parts by weight, with the use of a metallic roller having a surface with ten point roughness of 6 to 15 μm and a step of assembling a lenticular lens sheet.

18. A process according to claim 17, wherein the Fresnel lens sheet includes 9 to 20 parts by weight of said light diffusible fine particles.

* * * * *